US012208676B2

United States Patent
Stephan et al.

(10) Patent No.: US 12,208,676 B2
(45) Date of Patent: Jan. 28, 2025

(54) ONE-PIECE PORTAL WHEEL END MOUNTING SYSTEM

(71) Applicant: Super ATV, LLC, Madison, IN (US)

(72) Inventors: Jordan E. Stephan, Hanover, IN (US); Kyle Kempker, Hanover, IN (US)

(73) Assignee: Super ATV, LLC, Madison, IN (US)

( * ) Notice: Subject to any disclaimer, the term of this patent is extended or adjusted under 35 U.S.C. 154(b) by 0 days.

(21) Appl. No.: 18/310,147

(22) Filed: May 1, 2023

(65) Prior Publication Data

US 2023/0264567 A1 Aug. 24, 2023

Related U.S. Application Data

(63) Continuation of application No. 16/937,790, filed on Jul. 24, 2020, now abandoned.

(60) Provisional application No. 62/878,769, filed on Jul. 26, 2019.

(51) Int. Cl.
| | | |
|---|---|---|
| *B60K 17/04* | (2006.01) | |
| *B60B 35/00* | (2006.01) | |
| *B60G 17/00* | (2006.01) | |
| *B60K 17/30* | (2006.01) | |
| *F16H 57/022* | (2012.01) | |
| *F16H 57/025* | (2012.01) | |
| *F16H 57/02* | (2012.01) | |

(52) U.S. Cl.
CPC .......... *B60K 17/043* (2013.01); *B60B 35/001* (2013.01); *B60G 17/00* (2013.01); *B60K 17/303* (2013.01); *F16H 57/022* (2013.01); *F16H 57/025* (2013.01); *F16H 2057/02056* (2013.01)

(58) Field of Classification Search
CPC .. B60K 17/043; B60K 17/303; B60B 35/001; F16H 57/022; F16H 57/025; F16H 2057/02056
See application file for complete search history.

(56) References Cited

U.S. PATENT DOCUMENTS

| | | | |
|---|---|---|---|
| 3,420,327 A | 1/1969 | Nallinger | |
| 3,822,757 A | 7/1974 | Spence | |
| 4,111,455 A | 9/1978 | Hickman | |

(Continued)

FOREIGN PATENT DOCUMENTS

| | | |
|---|---|---|
| CN | 103328236 A | 9/2013 |
| CN | 204936705 U | 1/2016 |

(Continued)

OTHER PUBLICATIONS

English translation of Chinese Office Action issued May 10, 2023 in related CN202080061839.X (pp. 10).

(Continued)

*Primary Examiner* — Thomas C Diaz
(74) *Attorney, Agent, or Firm* — Woodard, Emhardt, Henry, Reeves & Wagner, LLP (57) ABSTRACT

A mounting system for a portal lift assembly of an off-road vehicle includes a housing having a rear wall, a front wall, and a side wall. The rear wall includes an opening to receive the end of one of the vehicle's axles, and the front wall includes an opening to allow an output shaft to extend outward from the housing. The rear wall also includes an integral mounting brackets effective to mount the box to an upper A-arm to the rear wall, and a lower A-arm to the rear wall.

15 Claims, 12 Drawing Sheets

(56) References Cited

U.S. PATENT DOCUMENTS

| | | | |
|---|---|---|---|
| 4,344,501 A | 8/1982 | Jerry et al. | |
| 4,437,630 A | 3/1984 | Young | |
| 4,986,386 A | 1/1991 | Iwamoto et al. | |
| 5,785,218 A | 7/1998 | LaLone | |
| 6,254,194 B1 | 7/2001 | Capouellez | |
| 6,398,240 B1 | 6/2002 | Taylor | |
| 6,416,136 B1 | 7/2002 | Smith | |
| 6,685,275 B2 | 2/2004 | Gorges | |
| 7,458,594 B2 | 12/2008 | Kim | |
| 7,762,372 B2 | 7/2010 | LeBlanc, Sr. | |
| 7,766,353 B2 | 8/2010 | LeBlanc, Sr. | |
| 7,909,127 B1* | 3/2011 | Pionke | B60K 17/303 180/255 |
| 8,118,133 B2 | 2/2012 | Armfield | |
| 8,925,941 B2 | 1/2015 | Cordier et al. | |
| 8,985,264 B2 | 3/2015 | Shirley | |
| 9,068,644 B2 | 6/2015 | Cannata | |
| 2004/0200660 A1 | 10/2004 | Szalal | |
| 2006/0138740 A1 | 6/2006 | Nam | |
| 2006/0207384 A1* | 9/2006 | Hardy | F16H 57/021 74/640 |
| 2007/0145816 A1 | 6/2007 | Gile | |
| 2013/0093154 A1 | 4/2013 | Cordier et al. | |
| 2017/0097084 A1* | 4/2017 | Eaton | B60B 35/001 |
| 2018/0094697 A1 | 4/2018 | Shirley | |
| 2019/0389304 A1 | 12/2019 | Wood et al. | |

FOREIGN PATENT DOCUMENTS

| | | |
|---|---|---|
| CN | 206242917 U | 6/2017 |
| CN | 206416782 U | 8/2017 |
| CN | 207140713 U | 3/2018 |
| CN | 209037309 U | 6/2019 |
| DE | 10 2017 111 793 A1 | 12/2018 |
| EP | 0877672 B1 | 8/1999 |
| EP | 2004444 | 3/2012 |
| EP | 3 061 332 A1 | 8/2016 |
| GB | 1049140 | 11/1966 |
| JP | 2017-094775 | 6/2017 |
| WO | WO 2018140774 | 8/2018 |

OTHER PUBLICATIONS

Machine translation of CN204936705U on Jun. 16, 2023 by PatDocs PDF (pp. 7).
Machine translation of CN206242917U by PatDocs PDF on Jun. 16, 2023 (pp. 9).
Machine translation of CN206416782U by PatDocs PDF on Jun. 13, 2023 (pp. 8).
Machine translation of CN209037309U by PatDocs PDF on Jun. 16, 2023 (pp. 7).
English Translation of EP 0877672, retrieved Jan. 11, 2021.
PCT Search Report for PCT/US2020/043670, dated Nov. 11, 2020.
PCT Written Opinion for PCT/US2020/043670, dated Nov. 3, 2020.

* cited by examiner

FIG. 12

ONE-PIECE PORTAL WHEEL END MOUNTING SYSTEM

CROSS-REFERENCE TO RELATED APPLICATION

This application is a continuation application of U.S. patent application Ser. No. 16/937,790 filed Jul. 24, 2020 and claims the benefit of U.S. Provisional Patent Application No. 62/878,769, filed Jul. 26, 2019, which are both hereby incorporated by reference.

FIELD OF THE INVENTION

The present invention relates generally to portal wheel ends for lifting the wheels of an off road vehicle such as an all-terrain vehicle (ATV) or a utility task vehicle (UTV), and more particularly to a mounting system for improving the strength and fitment of the mounting structure.

BACKGROUND OF THE INVENTION

Portal boxes are used by ATV and UTV enthusiasts to raise an off-road vehicle higher above the ground so that larger tires can be run on the vehicle. In addition, since larger diameter tires cover a greater distance with each rotation, portal box assemblies typically include gear reduction so that a single rotation of the vehicle power axle results in a slightly lesser rotation of the output axle. Further, the extra length provided by the output axle also typically allows the assembly to widen the wheelbase of the vehicle.

Portal boxes are typically mounted to an ATV/UTV by mounting a backing plate to the portal box, and by mounting the suspension of the vehicle to the backing plate. U.S. Pat. No. 8,985,264 to Shirley is one example of such a device.

Among the improvements made by applicant to portal gear box assemblies are improvements designed to lengthen the wheelbase of the vehicle and to provide the ability to select among several wheelbase lengths. The connection between the portal output shaft and the associated wheel hub has also been improved by applicant to reduce vibration in the wheel. Additionally, the braking system used by portal gear boxes has been improved to increase braking power and reliability.

The connection between the portal box and the vehicle suspension has not heretofore been optimized to improve the strength and fitment of the mounting structure. The present invention addresses that need.

SUMMARY OF THE INVENTION

Briefly describing one aspect of the present invention, there is provided a portal gear box assembly for an all-terrain vehicle or a utility task vehicle. One embodiment of that aspect of the invention provides a portal gear box assembly the assembly that comprises:
a) a housing having a rear wall, a front wall, and a side wall,
wherein said rear wall includes a vehicle axle opening effective to receive the end of an axle of an all-terrain vehicle or a utility task vehicle, and
wherein said front wall includes an output shaft opening effective to allow an output shaft to extend outward from said housing;
b) a linking mechanism housed in said housing and effective for linking an axle received in the vehicle axle opening to an output shaft;
c) an output shaft operably connectable via said linking mechanism to an axle received in the vehicle axle receptacle, and effective to rotate upon rotation of the stock axle;
wherein said housing rear wall includes an integral mounting bracket effective to allow the vehicle suspension to connect directly to the rear wall.

Another embodiment of the aforementioned aspect of the invention provides a portal gear box assembly in which the integral mounting bracket(s) are effective to allow an A-arm, a trailing arm, or a swing arm, to connect directly to the rear wall.

In another embodiment the rear wall of the housing further includes an integral mounting bracket effective to allow a steering linkage to connect directly to the rear wall.

DESCRIPTION OF THE PREFERRED EMBODIMENTS

For the purposes of promoting an understanding of the principles of the invention, reference will now be made to certain embodiments and specific language will be used to describe the same. It will nevertheless be understood that no limitation of the scope of the invention is thereby intended, such alterations and further modifications in the described invention, and such further applications of the principles of the invention as illustrated therein, being contemplated as would normally occur to one skilled in the art to which the invention relates.

In one embodiment the present invention provides an assembly for mounting a portal gear box to an all-terrain vehicle or a utility task vehicle. As previously indicated, portal boxes are typically mounted to an ATV/UTV by mounting a backing plate to the portal box, and by mounting the suspension of the vehicle to the backing plate. The inventive portal box/mounting assembly avoids using a backing plate, and instead uses a portal box housing having integral mounting brackets. The use of integral mounting brackets provides a more secure and robust mounting of the box.

The inventive portal box/mounting assembly preferably comprises a housing having a rear wall, a front wall, and a side wall. The rear wall has an opening to receive an axle of an all-terrain vehicle or a utility task vehicle. The front wall has an opening to allow an output shaft to extend outward from the housing, with the vehicle wheels being mounted to the output shaft. A linking mechanism is provided in the housing, and is effective for linking the vehicle axle to the output shaft.

The inventive portal box/mounting assembly may be adapted to receive any axle of an all-terrain vehicle or a utility task vehicle. The axle may be referred to as a "stock axle," and may be any axle that is powered by the drive train, regardless of whether it is an OEM axle or a replacement part. The axle may be an extended length axle, such as, for example, when the portal box assembly is installed with a lift kit which uses, and may even require, an extended length axle.

To allow the assembly to be mounted to a vehicle, the rear wall of the housing includes one or more integral mounting brackets effective to allow a vehicle suspension component to connect directly to the rear wall. The vehicle suspension component may be, for example, an A-arm, a trailing arm, a swing arm, etc. However, it is to be appreciated that other suspension components useful for mounting the vehicle to the portal box assembly (preferably such that the vehicle is ultimately supported by the wheels mounted on the output axle extending from the portal box) may be used, depending on the suspension system used in the vehicle being provided with the portal box assembly.

When the wheel is to be steered, the inventive portal box/mounting assembly also provides a structure to connect the assembly to the steering linkage, such as the tie rod to the rack and pinion. In the most preferred embodiments the structure for connecting the portal box assembly to the steering component is also made integral with the portal box housing, however, that is not required in all embodiments.

As previously indicated, the mounting brackets used to connect the suspension and/or the steering component(s) to the portal box are made into the rear wall of the housing, and are integral with it. For the purposes of this description, describing mounting brackets as being "integral" with the rear wall means that the brackets and rear wall are formed as a unit, and are not distinct parts, as would be the case with a traditional portal box-plus-backing plate construction. Accordingly, the backing plates used in prior art portal box assemblies are unnecessary, and are thus avoided. This use of a single piece to cover the rear portion of the portal box and to provide a structure for mounting the suspension to the box, provides benefits in strength and structural integrity that are not provided by prior art, two-piece constructions.

The integral brackets are preferably machined into the metal used to form the rear wall of the portal box, as opposed to being bolted on as would be the case if the brackets were made of sheet steel as prior art mounting brackets are. Alternatively, the rear wall/mounting bracket component may be forged, or cast, or otherwise made as a single piece of material.

In one preferred embodiment of the present invention the rear wall of the housing includes a first integral mounting bracket that is effective to allow an upper A-arm to connect directly to the rear wall, and a second integral mounting bracket that is effective to allow a lower A-arm to connect directly to the rear wall. In other embodiments the rear wall of the housing includes one or more integral mounting brackets effective to allow a trailing arm, or a swing arm, or some other suspension component to connect directly to the rear wall, In other embodiments the rear wall of the housing includes one or more integral mounting brackets effective to allow a vehicle steering component to connect directly to the rear wall. For example, the integral mounting bracket may be effective to allow a steering linkage to connect directly to the rear wall.

In view of the above, it can be seen that in one embodiment preferred for use on wheels that will be steered (presumably, the front wheels), the rear wall of the housing includes an integral mounting bracket effective to allow an upper A-arm to connect directly to the rear wall, an integral mounting bracket effective to allow a lower A-arm to connect directly to the rear wall, and an integral mounting bracket effective to allow a steering linkage to connect directly to the rear wall. Similarly, in one embodiment preferred for use on wheels that will not be steered (presumably, the rear wheels), the rear wall of the housing includes an integral mounting bracket effective to allow an upper A-arm to connect directly to the rear wall, and an integral mounting bracket effective to allow a lower A-arm to connect directly to the rear wall.

Figure 1:
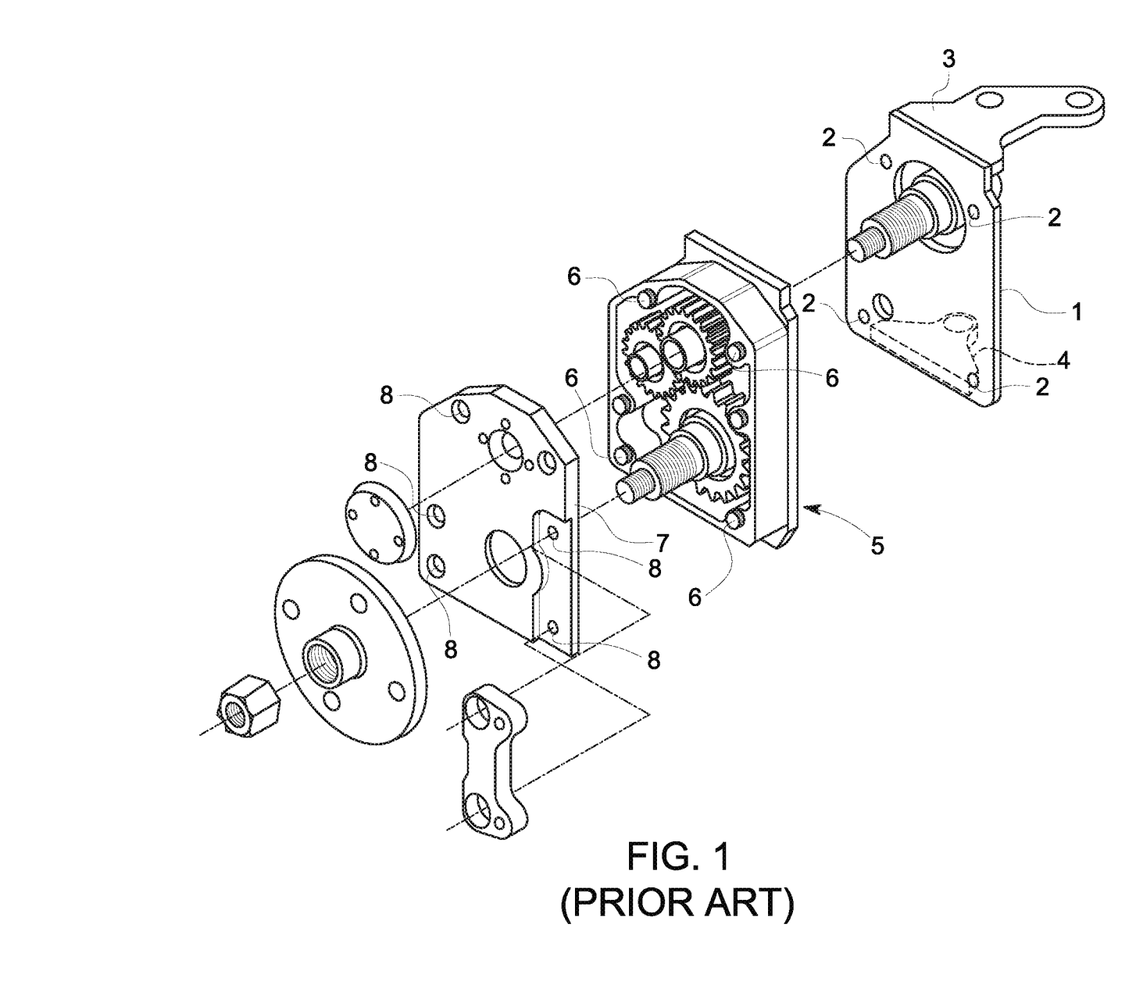
FIG. 1 is an exploded view of a prior art portal box mounting system.

Referring now to the drawings, FIG. 1 shows a prior art assembly in which a backing plate is required to connect the portal gear box to the vehicle suspension. Backing plate 1 is bolted onto gear box case 5 to provide the structure that is necessary to attach the gear box to the vehicle suspension. In particular, the backing plate 1, case 5, and cover 7 are held together by bolts passing through respective holes in these components.

In the prior art assemblies, each backing plate 1 is provided with upper and lower mounting brackets 3 and 4, respectively. Four spaced portal box mounting bolt holes 2 are provided about the periphery of the plate. The brackets 3, 4, are attached to the plate 1, preferably by welding.

The peripheral wall of prior art case 5 has a set of through holes 6 alignable with the mounting holes 2 in the backing plate 1. Holes 6 may therefore be used to secure case 5 to backing plate 1. Similarly, the cover 7 of the prior art assembly has holes 8 that align with holes 6, and thereby may be used to secure cover 7 to the case 5.

Mounting/securing bolts are used to secure cover 7 to case 5 and to backing plate 1. The mounting/securing bolts extend through holes 8 in cover 7, and then through holes 6 in case 5, to secure cover 7 and case 5 and to backing plate 1.

FIGS. 2-10 show various embodiments of the inventive portal box assembly that avoids the need for a backing plate. In the illustrated embodiments the required mounting hardware is provided on the rear wall of the box, and is made integral with it to avoid the need to mount the mounting hardware to the back plate of the box. This improved, one-piece construction provides a more secure attachment that reduces flex and increases the strength and rigidity compared with prior art assemblies.

Figure 2:
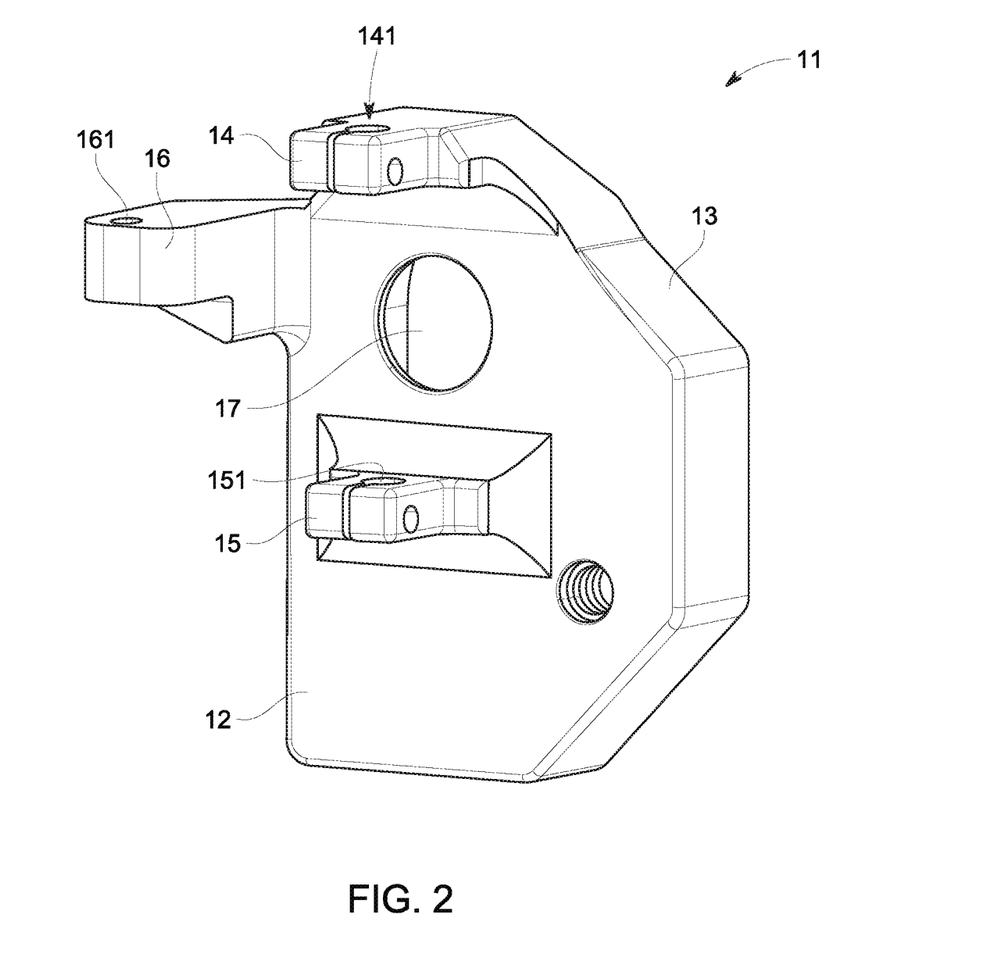
FIG. 2 is a perspective view of one embodiment of the portal box housing used in the present invention, showing mounting brackets typically used on a front wheel.

In FIG. 2, housing member 11 has a rear wall 12 and a side wall 13. Rear wall 12 includes a vehicle axle opening 17 effective to receive the end of an axle of an all-terrain vehicle or a utility task vehicle. Rear wall 12 also includes an integral mounting bracket 14 effective to allow an upper A-arm to connect directly to the rear wall at connection location 141, and an integral mounting bracket 15 effective to allow a lower A-arm to connect directly to the rear wall at connection location 151. An integral mounting bracket 16 effective to allow a steering linkage to connect directly to the rear wall is also provided. The embodiment shown in FIG. 2 is the embodiment that is typically used on the front wheels which are steered via the steering linkage.

Figure 3:
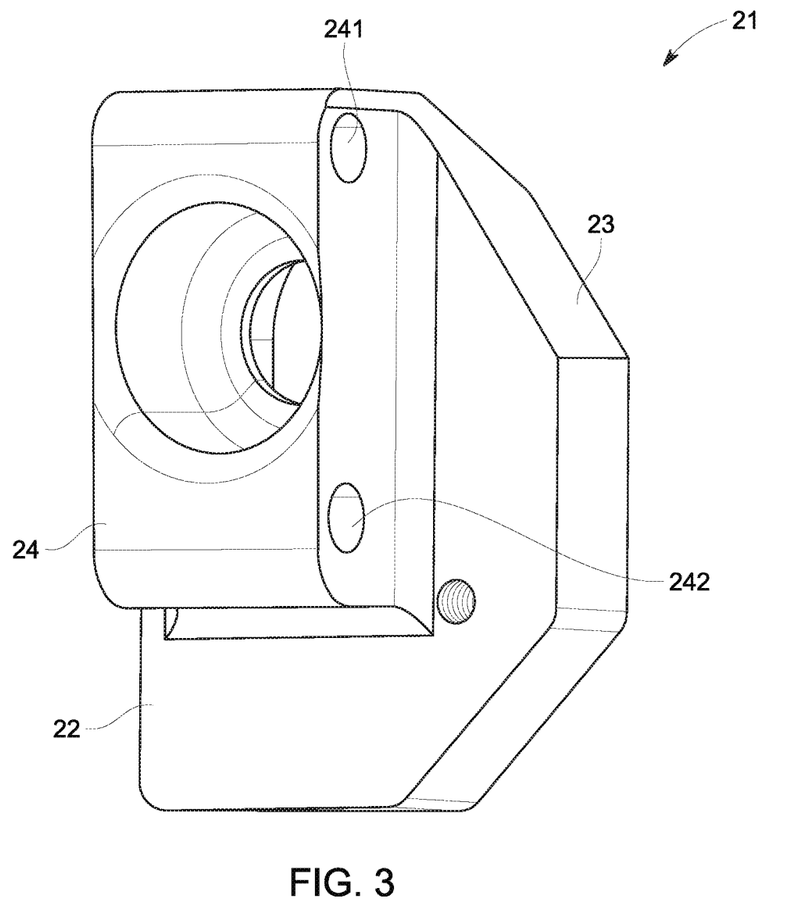
FIG. 3 is a perspective view of one embodiment of the portal box housing used in the present invention, showing mounting brackets typically used on a rear wheel.

FIG. 3 shows a housing member 21 with a rear wall 22 and a side wall 23. Rear wall 22 includes a vehicle axle opening 27 effective to receive the end of an axle of an all-terrain vehicle or a utility task vehicle. Rear wall 22 also includes an integral mounting bracket 24 effective to allow an upper A-arm to connect directly to the rear wall at connection location 241, and effective to allow a lower A-arm to connect directly to the rear wall at connection location 242. The embodiment shown in FIG. 3 is the embodiment that is typically used on the rear wheels which are not steered via a steering linkage.

Figure 4:
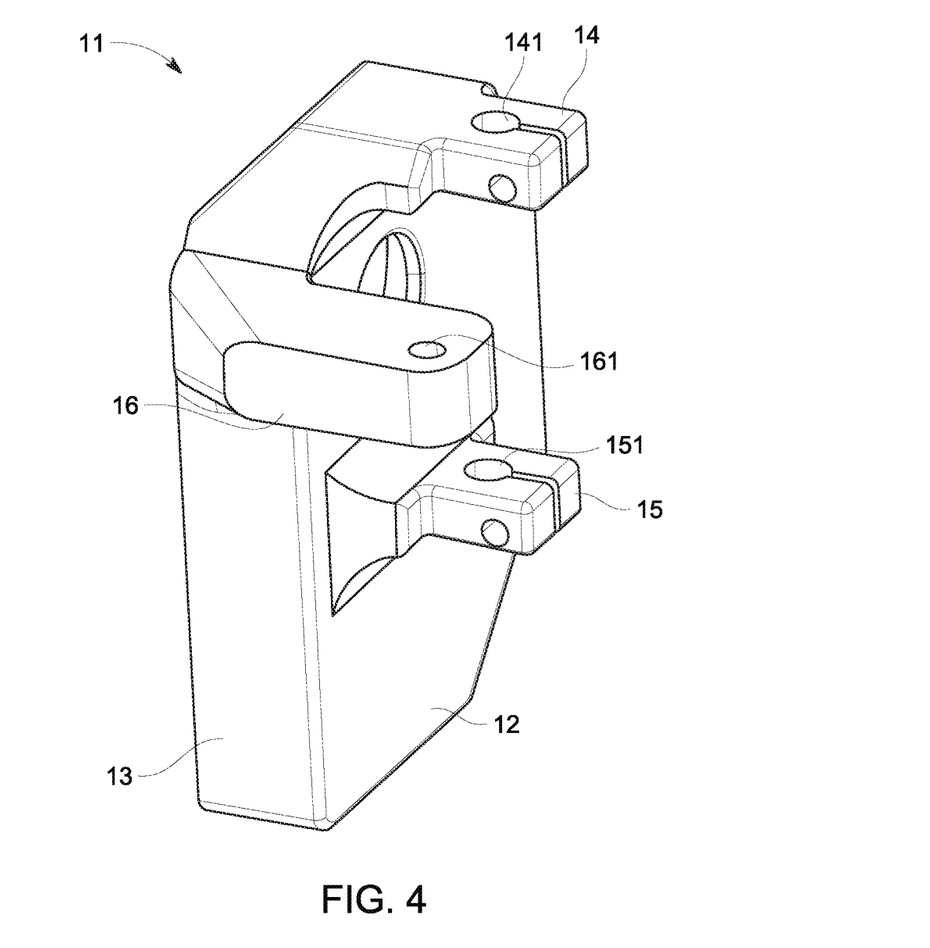
FIG. 4 is a perspective view of the embodiment of FIG. 2, showing the portal box housing used in the present invention with mounting brackets typically used on a front wheel.

FIG. 4 shows another perspective view of the housing of FIG. 2. Housing member 11 has a rear wall 12 and a side wall 13. Rear wall 12 includes an integral mounting bracket 14 effective to allow an upper A-arm to connect directly to the rear wall at connection location 141, and an integral mounting bracket 15 effective to allow a lower A-arm to connect directly to the rear wall at connection location 151. An integral mounting bracket 16 effective to allow a steering linkage to connect directly to the rear wall is also illustrated.

Figure 5:
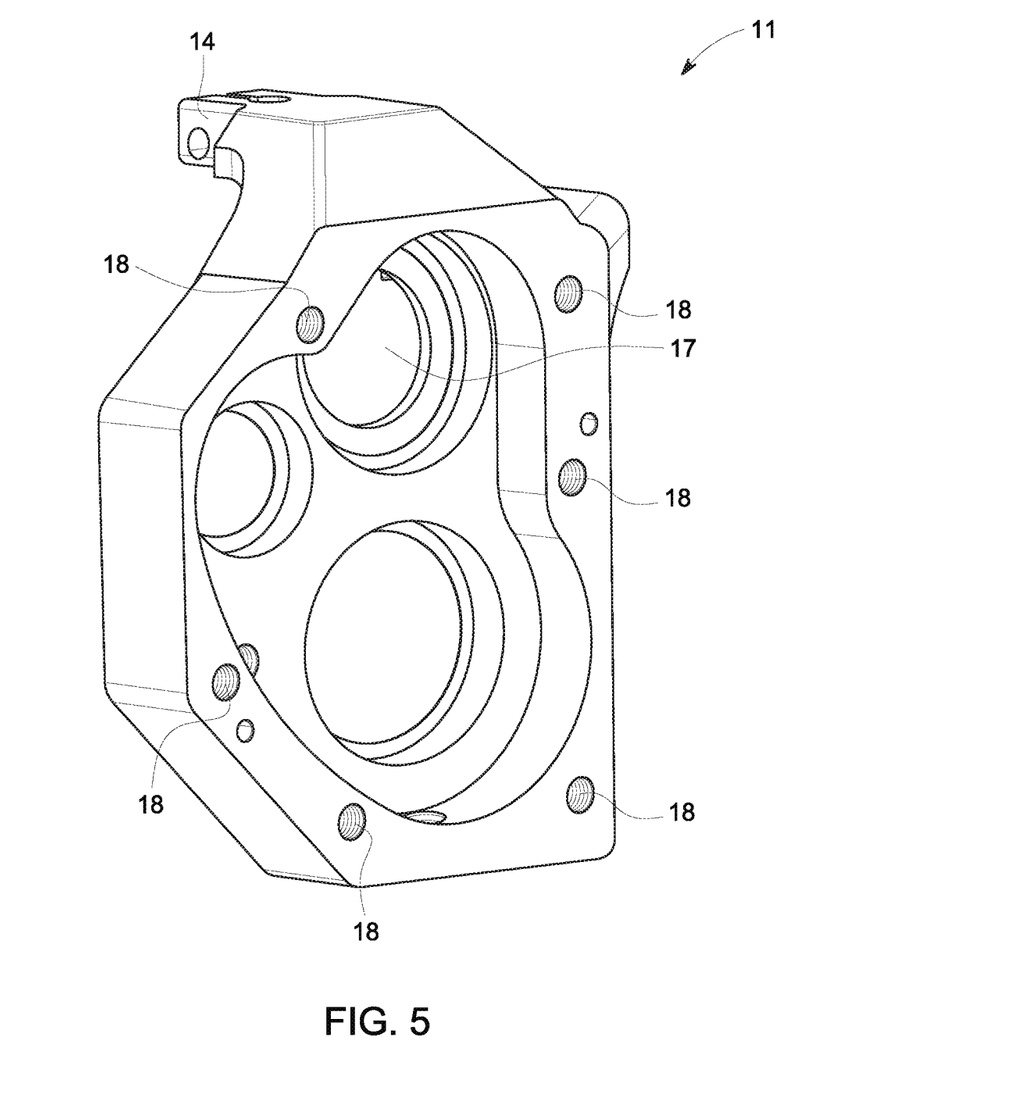
FIG. 5 is a perspective view of the embodiment of FIG. 2, showing the portal box housing used in the present invention with mounting brackets typically used on a front wheel.

FIG. 5 shows another perspective view of the housing of FIG. 2. Housing member 11 has a rear wall 12 and a side wall 13, and rear wall 12 includes a vehicle axle opening 17 effective to receive the end of an axle of an all-terrain vehicle or a utility task vehicle. Portions of an integral mounting structure of the type typically used on a front wheel is illustrated. Threaded holes 18 allow a cover plate to be mounted to the housing to protect the internal components.

Figure 6:
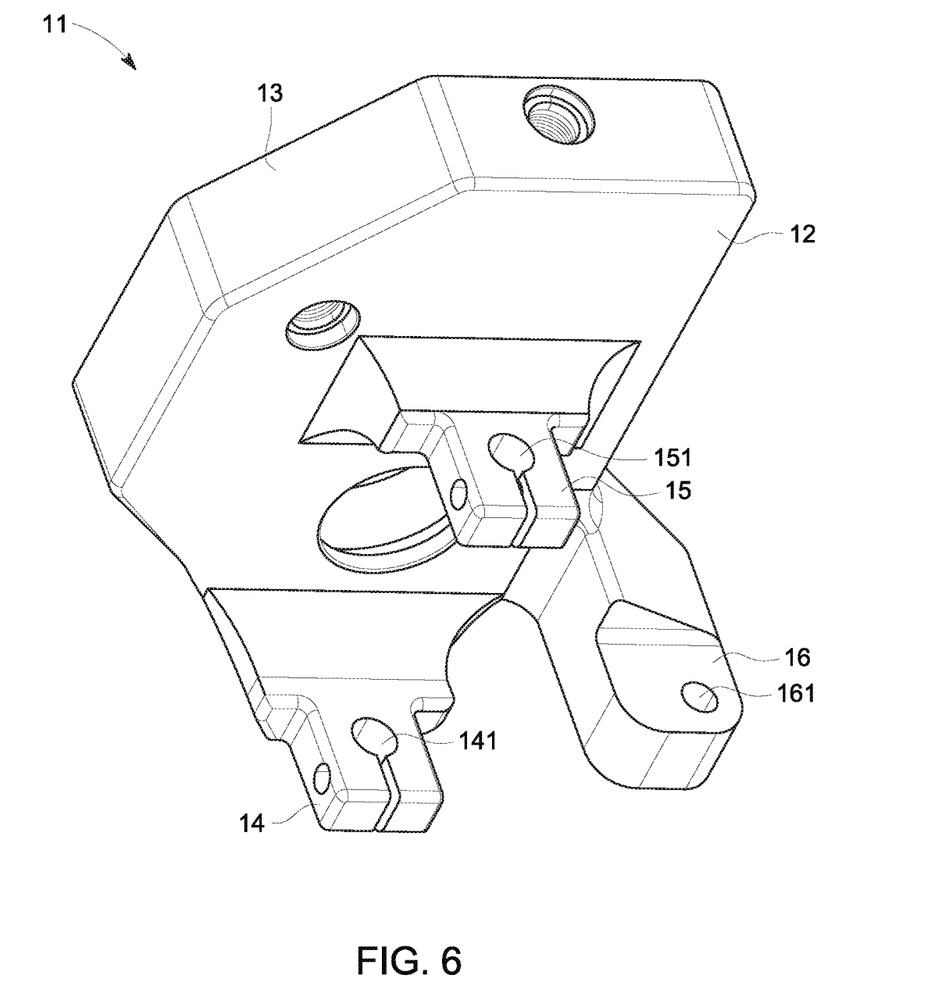
FIG. 6 is a perspective view of the embodiment of FIG. 2, showing the portal box housing used in the present invention with mounting brackets typically used on a front wheel.

FIG. 6 shows another perspective view of the housing of FIG. 2, showing integral mounting brackets of the type typically used on a front wheel. Housing member 11 has a rear wall 12 that includes an integral mounting bracket 14 effective to allow an upper A-arm to connect directly to the rear wall at connection location 141, and an integral mounting bracket 15 effective to allow a lower A-arm to connect directly to the rear wall at connection location 151. An integral mounting bracket 16 effective to allow a steering linkage to connect directly to the rear wall is also shown in the Figure.

Figure 7:
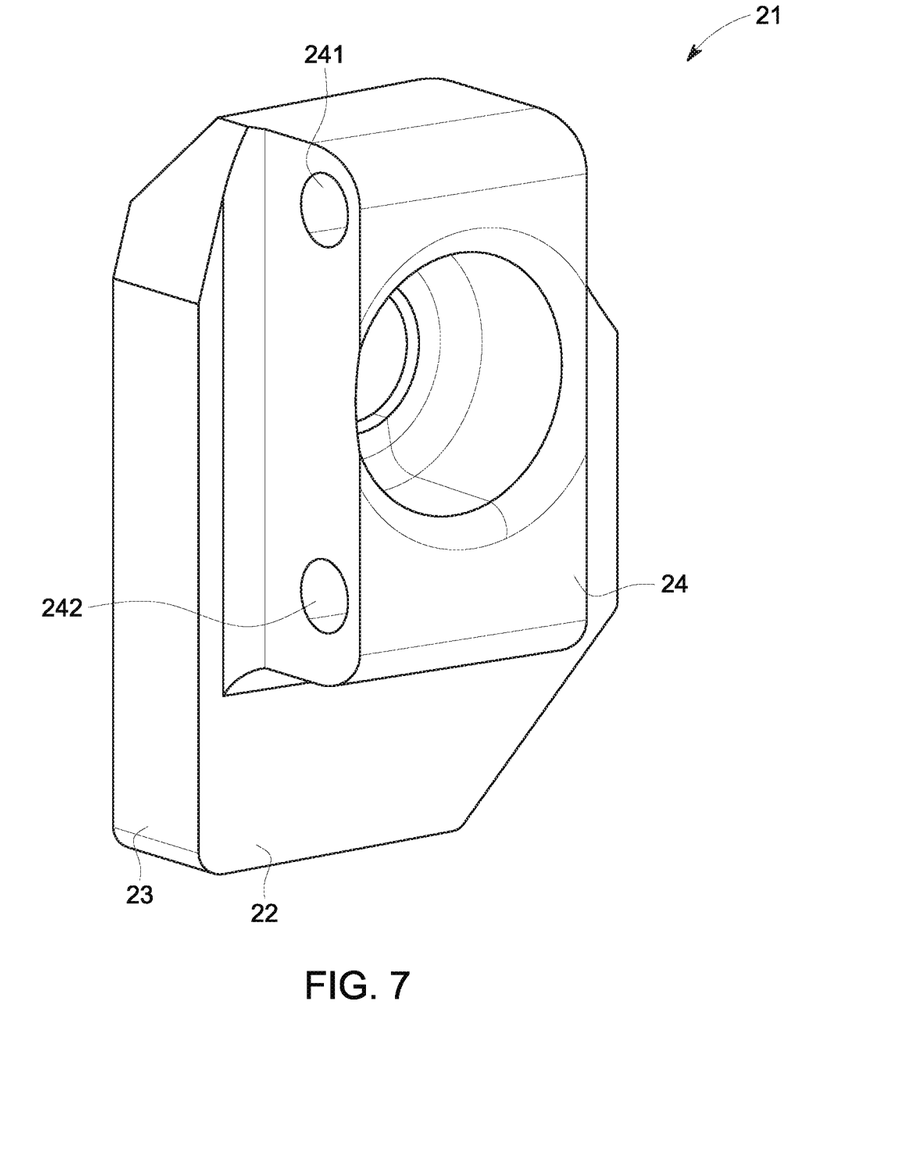
FIG. 7 is a perspective view of the embodiment of FIG. 3, showing the portal box housing used in the present invention with mounting brackets typically used on a rear wheel.

FIG. 7 shows a perspective view of the housing of FIG. 3 showing integral mounting brackets of the type typically used on a rear wheel. Rear wall 22 includes an integral mounting bracket 24 effective to allow an upper A-arm to connect directly to the rear wall at connection location 241, and effective to allow a lower A-arm to connect directly to the rear wall at connection location 242.

Figure 8:
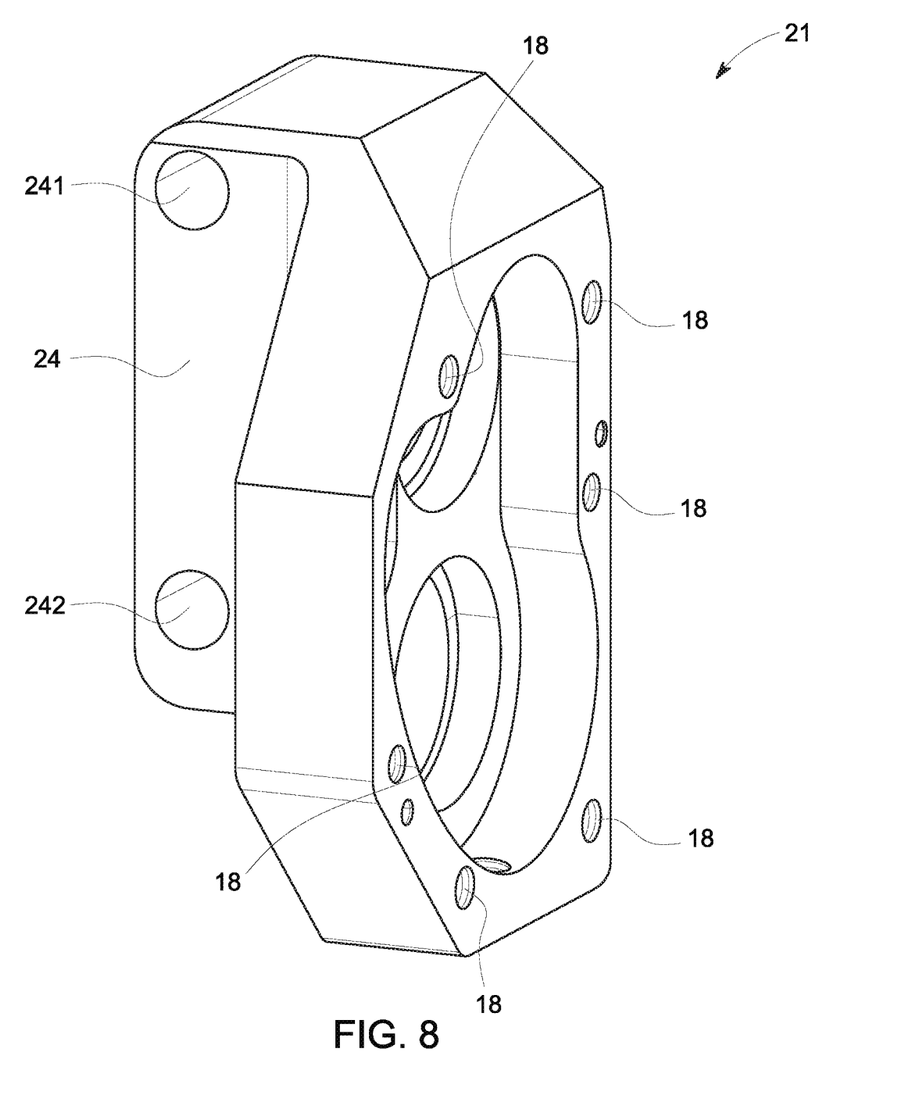
FIG. 8 is a perspective view of the embodiment of FIG. 3, showing the portal box mounting system with mounting brackets typically used on a rear wheel.

FIG. 8 shows a perspective view of the housing of FIG. 3, showing integral mounting brackets of the type typically used on a rear wheel. Rear wall 22 includes an integral mounting bracket 24 effective to allow an upper A-arm to connect directly to the rear wall at connection location 241, and effective to allow a lower A-arm to connect directly to the rear wall at connection location 242.

Figure 9:
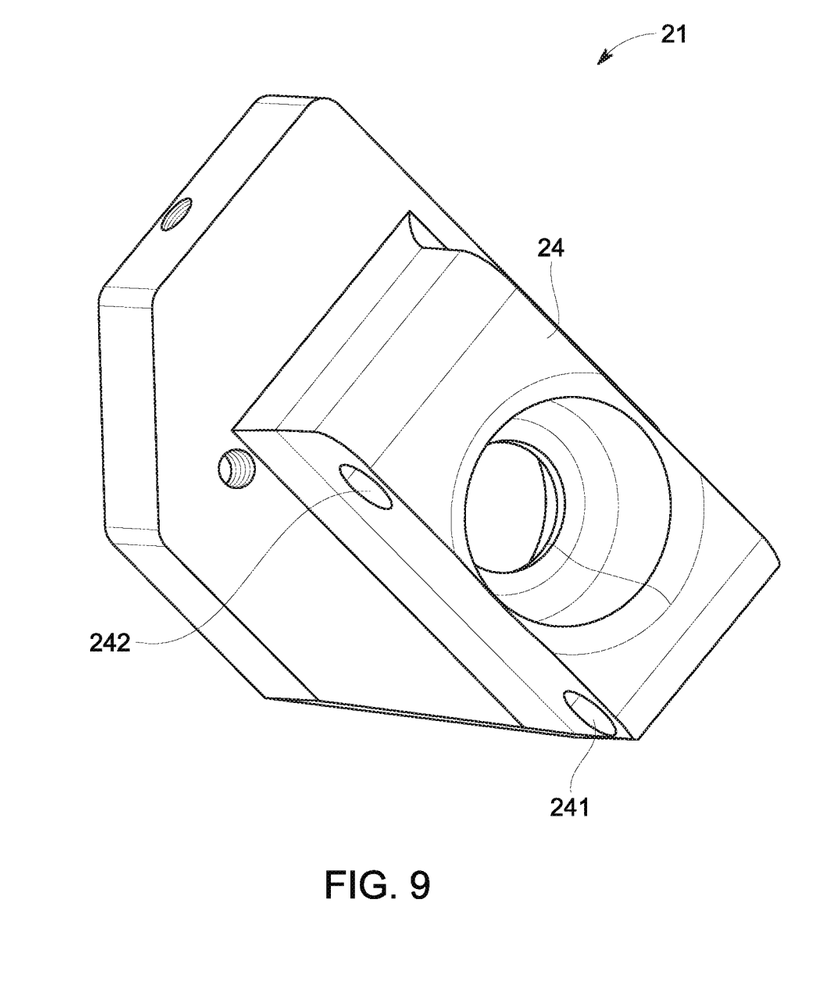
FIG. 9 is a perspective view of the embodiment of FIG. 3, showing the portal box housing used in the present invention with mounting brackets typically used on a rear wheel.

FIG. 9 shows another perspective view of the housing of FIG. 3, showing integral mounting brackets of the type typically used on a rear wheel. Rear wall 22 includes a vehicle axle opening 27 effective to receive the end of an axle of an all-terrain vehicle or a utility task vehicle. Rear wall 22 also includes an integral mounting bracket 24 effective to allow an upper A-arm to connect directly to the rear wall at connection location 241, and effective to allow a lower A-arm to connect directly to the rear wall at connection location 242.

Figure 10:
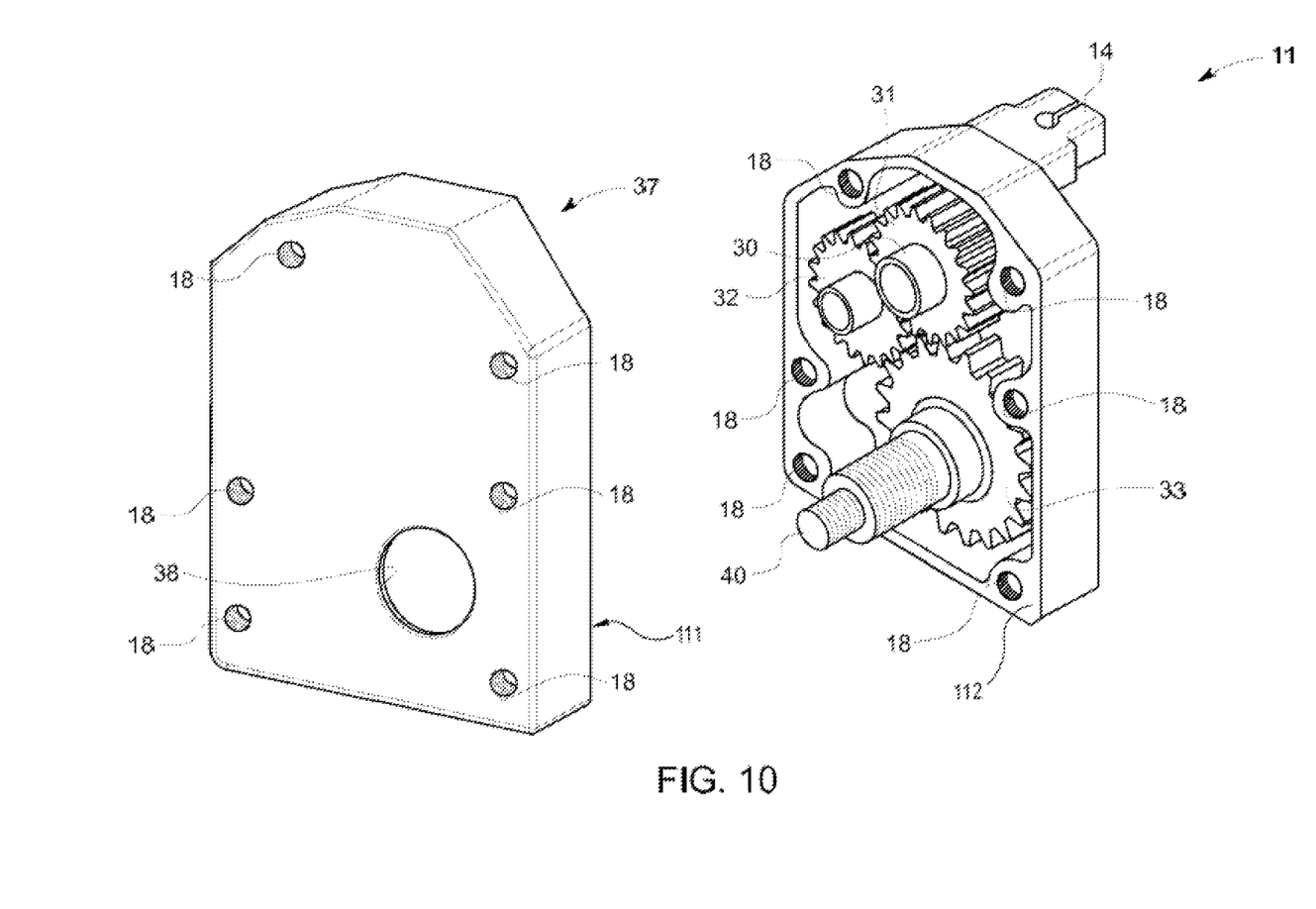
FIG. 10 is an exploded view of a portal gear box assembly according to one embodiment of the present invention, showing the housing, linking mechanism, output shaft, and outer cover.

FIG. 10 shows an exploded view of a portal gear box assembly according to one embodiment of the present invention, showing the housing, linking mechanism, output shaft, and outer cover. Housing 11 includes integral mounting brackets 14 and 15, and steering linkage connection bracket 16. A linking mechanism comprising an input gear 31, an idler gear 32, and an output gear 33 are housed in the housing, and effective for linking an axle 30 received in the vehicle axle opening to an output shaft 40.

Figure 11:
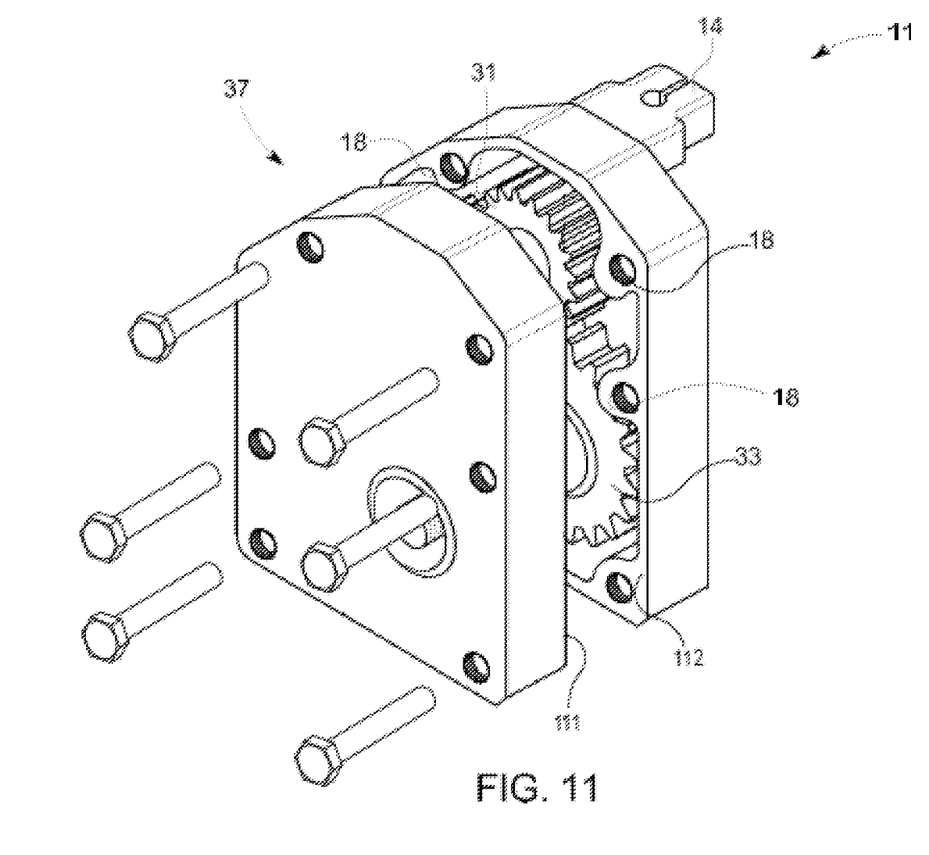
FIG. 11 is a perspective view of the portal gear box assembly of FIG. 10 as the two halves of the housing are moved toward each other to be bolted together.

FIG. 11 is a perspective view of the portal gear box assembly of FIG. 10 as the two halves of the housing are moved toward each other to be bolted together. This Figure shows the trailing edge of the front side wall being moved to match and mate with the leading edge of the rear side wall so that the front housing member is connected to the rear housing member to provide a two-piece housing having a side wall comprising a rear side wall portion and a front sidewall portion.

Figure 12:
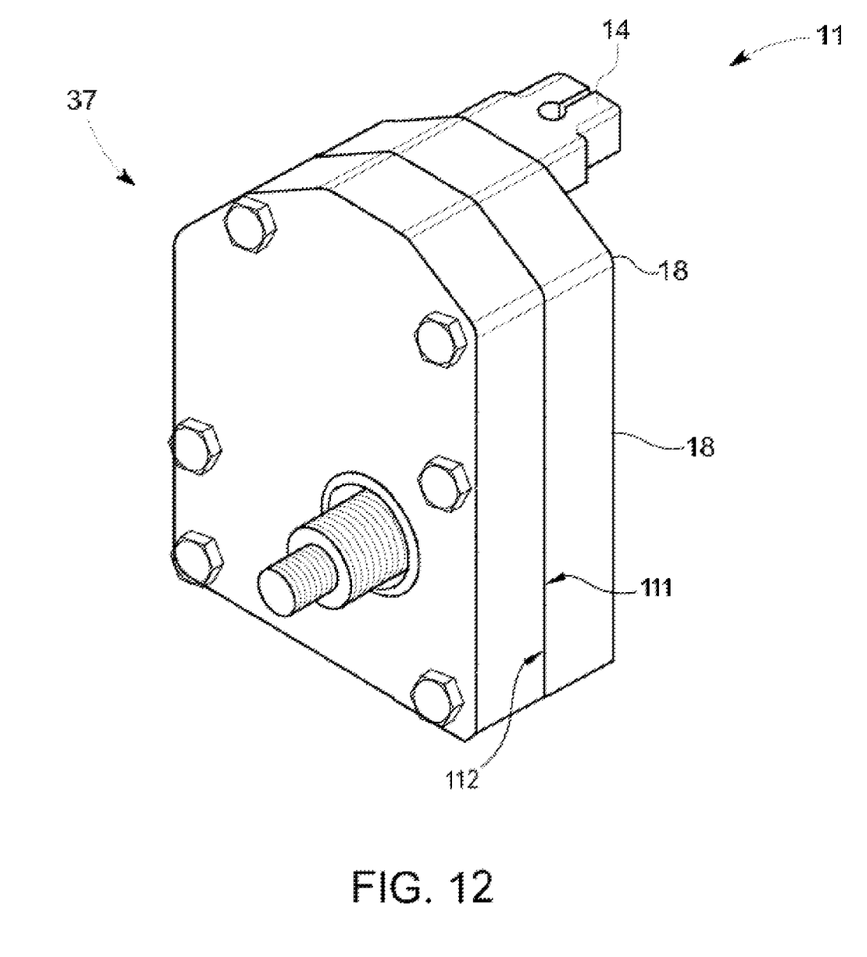
FIG. 12 is a perspective view of the portal gear box assembly of FIG. 10 after the two halves of the housing have been moved to each other and bolted together

FIG. 12 is a perspective view of the portal gear box assembly of FIG. 10 after the two halves of the housing have been moved to each other and bolted together. This Figure shows assembly after the trailing edge of the front side wall has been moved to match and mate with the leading edge of the rear side wall so that the front housing member is connected to the rear housing member to provide a two-piece housing having a side wall comprising a rear side wall portion and a front sidewall portion.

The illustrated linking mechanism includes gears sized to be effective for providing a gear reduction between the input shaft (vehicle axle) and the output shaft. A cover 37 including an opening 38 for output shaft 40 may be secured to housing 11, preferably with bolts-passing through bolt homes 18.

The inventive portal box assembly is stronger and provides a better fitment due to the tighter tolerances of machining vs sheet steel and tubing.

While the invention has been illustrated and described in detail in the drawings and foregoing description, the same are to be considered as illustrative and not restrictive, it being understood that only certain preferred embodiments have been shown and described and that all changes and modifications that come within the spirit of the invention are desired to be protected. In addition, it is to be appreciated that the present invention may comprise or consist essentially of any or all of the described or illustrated features. For example, the present invention includes devices and methods comprising any or all of the features described or illustrated in specification or drawings, and the present invention includes devices and methods consisting essentially of any or all of the features illustrated in the specification or drawings. Additionally, any or all of the features and/or embodiments disclosed herein may be combined with any or all of the other features and/or embodiments disclosed herein to provide a device or method that comprises or consists essentially of such features.

Finally, the grammatical device "and/or" (such as in "A and/or B") is used in this disclosure to mean A alone, or B alone, or both A and B.

The invention claimed is:

1. A portal gear box assembly for an all-terrain vehicle or a utility task vehicle, wherein the vehicle includes a rear axle, an upper A-arm, a lower A-arm and an output shaft, the portal gear box assembly comprising:
 a housing having a rear wall, a front wall, and a side wall;
 wherein said rear wall defines a vehicle axle opening effective to receive the rear axle;
 wherein said front wall includes an output shaft opening effective to receive the output shaft extending forward from said housing; and
 wherein said housing defines a recess configured to receive a linking mechanism effective to rotationally link the axle received in the vehicle axle opening to the output shaft; and
 a mounting bracket extending rearwardly from the rear wall, wherein the mounting bracket defines an extension opening aligned with the vehicle axle opening effective to pass the axle through the extension opening to the vehicle axle opening;
 wherein the mounting bracket defines a first connection location positioned above the extension opening, wherein the first connection location is effective to connect the upper A-arm to the mounting bracket; and
 wherein the mounting bracket defines a second connection location positioned below the extension opening, wherein the second connection location is effective to connect the lower A-arm to the mounting bracket;
 wherein the extension opening has a larger diameter than the vehicle axle opening;
 wherein the first connection location includes a first through passage that extends across the mounting bracket; and
 wherein the first through passage is longer than the diameter of the extension opening.

2. The portal gear box assembly of claim 1, wherein the first through passage is generally perpendicular to the extension opening.

3. The portal gear box assembly of claim 1, wherein the first through passage is generally perpendicular to the extension opening.

4. The portal gear box assembly of claim 1, wherein the second connection location includes a second through passage that extends across the mounting bracket.

5. The portal gear box assembly of claim 4, wherein the second through passage is longer than the diameter of the extension opening.

6. The portal gear box assembly of claim 4, wherein the second through passage is generally perpendicular to the extension opening.

7. The portal gear box assembly of claim 4, wherein the second through passage is approximately the same length as the first through passage.

8. The portal gear box assembly of claim 4, wherein the second through passage is generally parallel to the first through passage.

9. The portal gear box assembly of claim 1, wherein the mounting bracket completely surrounds the vehicle axle opening.

10. A portal gear box assembly for an all-terrain vehicle or a utility task vehicle, wherein the vehicle includes a rear axle, an upper A-arm, a lower A-arm and an output shaft, the portal gear box assembly comprising:
 a housing having a rear wall, a front wall, and a side wall;
 wherein said rear wall defines a vehicle axle opening effective to receive the rear axle;
 wherein said front wall includes an output shaft opening effective to receive the output shaft extending forward from said housing; and
 wherein said housing defines a recess configured to receive a linking mechanism effective to rotationally link the axle received in the vehicle axle opening to the output shaft; and
 a mounting bracket extending rearwardly from the rear wall, wherein the mounting bracket defines an extension opening aligned with the vehicle axle opening effective to pass the axle through the extension opening to the vehicle axle opening;
 wherein the mounting bracket defines a first connection location positioned above the extension opening, wherein the first connection location is effective to connect the upper A-arm to the mounting bracket; and
 wherein the mounting bracket defines a second connection location positioned below the extension opening, wherein the second connection location is effective to connect the lower A-arm to the mounting bracket;
 wherein the first connection location includes a first through passage that extends across the mounting bracket; and
 wherein the first through passage is longer than the diameter of the extension opening.

11. The portal gear box assembly of claim 1, wherein the first through passage is generally perpendicular to the extension opening.

12. The portal gear box assembly of claim 1, wherein the second connection location includes a second through passage that extends across the mounting bracket.

13. The portal gear box assembly of claim 12, wherein the second through passage is longer than the diameter of the extension opening.

14. The portal gear box assembly of claim 12, wherein the second through passage is generally perpendicular to the extension opening.

15. The portal gear box assembly of claim 12, wherein the second through passage is approximately the same length as the first through passage.

* * * * *